(12) United States Patent
Rufener

(10) Patent No.: US 11,016,445 B2
(45) Date of Patent: May 25, 2021

(54) TIMEPIECE MOVEMENT INCLUDING A DEVICE FOR DETECTING AN ANGULAR POSITION OF A WHEEL

(71) Applicant: ETA SA Manufacture Horlogere Suisse, Grenchen (CH)

(72) Inventor: Rene Rufener, Biel/Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 408 days.

(21) Appl. No.: 16/052,735

(22) Filed: Aug. 2, 2018

(65) Prior Publication Data
US 2019/0041803 A1    Feb. 7, 2019

(30) Foreign Application Priority Data

Aug. 4, 2017   (EP) .................................... 17184983

(51) Int. Cl.
  *G04B 47/06*    (2006.01)
  *G01D 5/241*    (2006.01)
  *G04C 3/14*     (2006.01)
(52) U.S. Cl.
  CPC ........... *G04B 47/06* (2013.01); *G01D 5/2412* (2013.01); *G04C 3/14* (2013.01)
(58) Field of Classification Search
  CPC .......... G04C 3/14; G04C 3/146; G04C 3/002; G01D 5/2412; G01D 5/2417
  See application file for complete search history.

(56) References Cited

U.S. PATENT DOCUMENTS

| | | | | |
|---|---|---|---|---|
| 5,077,635 A * | 12/1991 | Bollhagen | ............ | G01D 5/2412 361/287 |
| 5,910,781 A | 6/1999 | Kawamoto et al. | | |
| 6,218,803 B1 | 4/2001 | Montagu et al. | | |
| 6,307,814 B1 * | 10/2001 | Farine | ...................... | G04C 3/14 368/187 |

(Continued)

FOREIGN PATENT DOCUMENTS

| EP | 1 058 095 A2 | 12/2000 |
|---|---|---|
| EP | 3 007 013 A1 | 4/2016 |

(Continued)

OTHER PUBLICATIONS

European Search Report dated Feb. 8, 2018 in European Application 17184983.9 filed on Aug. 4, 2017 (with English Translation of Categories of Cited Documents & Written Opinion).

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A timepiece movement includes an analogue display, including a rotary indicator and a wheel that rotates as one with the rotary indicator. The wheel includes a plate with a locating element. The timepiece movement also includes a device for detecting at least one angular position of the locating element, which includes a board that is fixed with respect to the plate, extending substantially parallel to the plate, and on which a first electrode, a second electrode, and a common electrode are arranged. The electrodes are planar and are arranged such that, in one angular position of the wheel, the locating element is located over at least a portion of each electrode.

10 Claims, 1 Drawing Sheet

(56) References Cited

U.S. PATENT DOCUMENTS

| | | | |
|---|---|---|---|
| 10,310,452 B2* | 6/2019 | Lagorgette | G04C 3/14 |
| 2003/0030570 A1* | 2/2003 | Netzer | G01D 11/245 |
| | | | 340/870.37 |
| 2004/0081028 A1* | 4/2004 | Yiu | G04C 3/14 |
| | | | 368/185 |
| 2005/0002277 A1* | 1/2005 | Fukuda | G04C 17/0066 |
| | | | 368/80 |
| 2008/0018596 A1* | 1/2008 | Harley | G06F 3/044 |
| | | | 345/157 |
| 2012/0229150 A1 | 9/2012 | Inai | |
| 2016/0178402 A1 | 6/2016 | Klopfenstein et al. | |
| 2017/0185045 A1 | 6/2017 | Lagorgette et al. | |
| 2017/0307414 A1 | 10/2017 | Ferri et al. | |

FOREIGN PATENT DOCUMENTS

| | | |
|---|---|---|
| EP | 3 037 899 A1 | 6/2016 |
| GB | 2 320 578 A | 6/1998 |
| JP | 2004-163128 | 6/2004 |
| JP | 2004-233132 | 8/2004 |

* cited by examiner

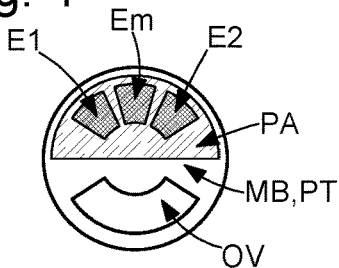
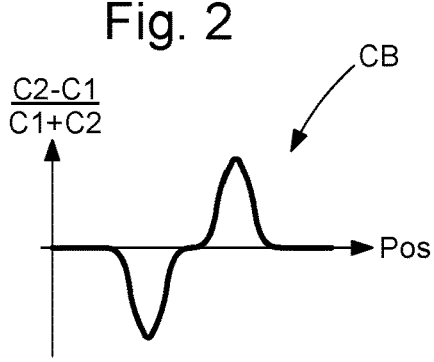
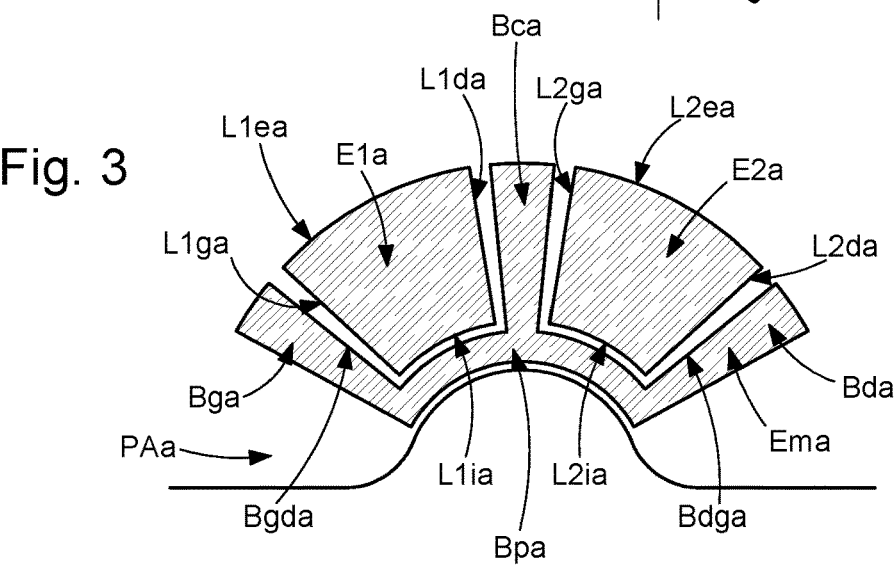
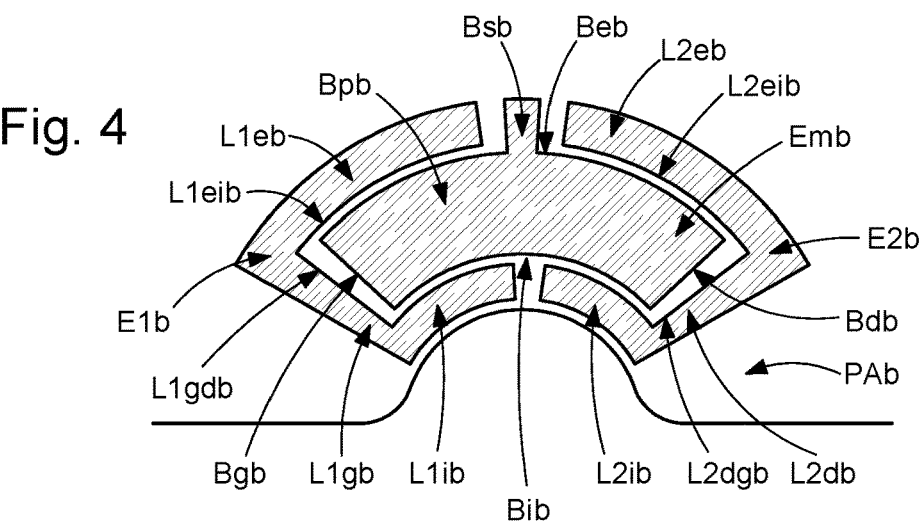
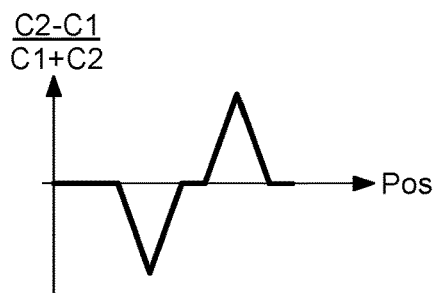

TIMEPIECE MOVEMENT INCLUDING A DEVICE FOR DETECTING AN ANGULAR POSITION OF A WHEEL

This application claims priority from European Patent Application No. 17184983.9 filed on Aug. 4, 2017, the entire disclosure of which is hereby incorporated herein by reference.

TECHNICAL FIELD

The invention relates to the field of timepiece movements provided with an analogue display and with at least one wheel that rotates as one with a rotary indicator of this analogue display. The invention relates more particularly to devices for detecting the angular position of such a wheel with a view to determining the angular position of the rotary indicator.

PRIOR ART

Devices for detecting at least one angular position of a wheel belonging to a watch movement are known. In particular, a detection device, a part of which is schematically illustrated in FIG. 1, is known from application EP15202349.5. The device comprises a printed circuit board PA, which is fixed with respect to the plate of the movement, and arranged parallel to the wheel MB. The board PA comprises three planar electrodes, referred to as the first electrode E1, second electrode E2 and common electrode Em. The electrodes take the shape of sectors of one and the same ring, the common electrode Em being placed between the first electrode E1 and the second electrode E2. The wheel MB includes an electrically conductive plate PT in which an opening OV has been made. The opening OV is arranged such that, when the wheel MB rotates, it can be successively located facing the first electrode E1 only, then the first electrode E1 and the common electrode Em, then all three electrodes, then the common electrode Em and the second electrode E2, and lastly the second electrode E2 only.

The detection device further includes an electronic circuit allowing potentials to be applied to the first electrode E1, the second electrode E2 and the common electrode Em. According to this circuit, pulsed voltages are applied to the first electrode E1 and to the second electrode E2 so as to charge the first electrode E1 and the second electrode E2 in alternation: the first electrode E1 is held at a high potential while the second electrode is held at a low potential, then vice versa. The common electrode Em is held at an intermediate potential, which is advantageously the mean of the high potential and the low potential.

Given that the first electrode E1 and the common electrode Em include lateral edges that are close to and facing one another, that they are at different potentials and that the potential of the first electrode E1 is variable, capacitive coupling takes place between these two electrodes: the capacitance between these two electrodes is referred to as the first capacitance C1. Similarly, given that the second electrode E2 and the common electrode Em include lateral edges that are close to and facing one another, that they are at different potentials and that the potential of the second electrode is variable, capacitive coupling takes place between these two electrodes: the capacitance between these two electrodes is referred to as the second capacitance C2.

The values of these capacitances C1 and C2 vary with the position of the opening OV of the wheel: when the opening OV is simultaneously over the first electrode E1 and the common electrode Em, the first capacitance C1 is at maximum since the wheel is not interrupting any electric field line between the first electrode E1 and the common electrode Em. Similarly, when the opening is simultaneously over the second electrode E2 and the common electrode Em, the second capacitance C2 is at maximum since the wheel is not interrupting any electric field line between the second electrode E2 and the common electrode Em.

The electronic circuit further includes an electronic assembly connected to the common electrode Em. The electronic assembly makes it possible to measure $(C2-C1)/(C1+C2)$ according to the position of the opening when the wheel MB rotates. A curve obtained from these measurements by linear interpolation is illustrated in FIG. 2. As explained above, this curve reaches a minimum when the first electrode E1 and the common electrode Em only are fully facing the opening OV, and a maximum when the common electrode Em and the second electrode E2 only are fully facing the opening OV.

SUMMARY OF THE INVENTION

The present invention aims to facilitate the detection of the maximum and of the minimum of the curve obtained by linear interpolation of the measurements of $(C2-C1)/(C1+C2)$ according to the angular position of the wheel, so as to make determining the angular position of the wheel more accurate.

To this end, the subject of the invention is a timepiece movement according to claim 1.

The common electrode therefore includes not only edges extending facing a lateral edge of the first electrode and a lateral edge of the second electrode, as is already the case in the prior art, but also edges extending facing a circumferential edge of the first electrode and a circumferential edge of the second electrode. The coupling between the common electrode and the first electrode and between the common electrode and the second electrode is therefore improved with respect to the prior art, since the total length of the common electrode facing the first electrode and facing the second electrode is greater. The coupling is both radial and lateral. Since the degree of coupling is greater, the curve exhibits a more pronounced maximum and minimum. More specifically, the curve is almost triangular in shape.

In a first embodiment, the timepiece movement comprises the features defined in claim 2. In an alternative first embodiment, the timepiece movement comprises the features defined in claim 3.

In the two aforementioned embodiments, the shape of the common electrode has been modified with respect to the prior art, so that it surrounds the first electrode and the second electrode on at least two of their sides.

Advantageously, the timepiece movement comprises the features defined in claim 4.

Thus, the common electrode surrounds the first electrode and the second electrode on at least three of their sides.

Advantageously, the timepiece movement comprises the features defined in claim 5 and/or in claim 6.

In a second embodiment, the timepiece movement comprises the features defined in claim 7.

In the second embodiment, the common electrode takes the overall shape of a ring sector, as in the prior art, but the shape of the first electrode and of the second electrode has been modified so that each one surrounds the common electrode on at least two of its sides.

Advantageously, the timepiece movement comprises the features defined in claim 8.

BRIEF DESCRIPTION OF THE FIGURES

Other features and advantages of the present invention will become apparent upon studying a number of embodiments, which are provided solely by way of nonlimiting example and with reference to the appended drawings, in which:

FIG. 1, described above, shows a wheel and part of a device for detecting the angular position of the wheel according to the prior art, the detection device including a board on which a first electrode, a second electrode and a common electrode are positioned FIG. 2, described above, shows a curve showing (C2−C1)/(C1+C2) according to the angle of rotation of the wheel, where C1 is the capacitance between the first electrode and the second electrode, and C2 the capacitance between the second electrode and the common electrode FIG. 3 shows the first electrode, the second electrode and a common electrode according to a first embodiment of the invention, positioned on a board of a device for detecting the angular position of a wheel FIG. 4 shows the first electrode, the second electrode and a common electrode according to a second embodiment of the invention, positioned on a board of a device for detecting the angular position of a wheel FIG. 5 shows a curve showing (C2−C1)/(C1+C2) according to the angle of rotation of the wheel, according to a non-limiting illustrative embodiment of this application.

DETAILED DESCRIPTION OF EMBODIMENTS

FIGS. 3 and 4 illustrate a board PAa according to a first embodiment of the invention and a board PAb according to a second embodiment of the invention, respectively, for replacing the board PA described above with reference to the prior art. Each of the two boards PA1, PA2 includes a first electrode E1*a*, E1*b*, a second electrode E2*a*, E2*b* and a common electrode Ema, Emb, all three of which are planar.

In the first embodiment, illustrated in FIG. 3, the first electrode E1*a* and the second electrode E2*a* of the board PAa are similar in shape to the first electrode E1 and to the second electrode E2 of the board PA: they take the shape of sectors of one and the same ring, the centre of which is the intersection between the board PAa and the axle of the wheel MB. The first electrode E1*a* and the second electrode E2*a* therefore include two lateral edges L1*ga*, L1*da* and L2*ga*, L2*da*, respectively, extending radially with respect to a circle, the centre of which would be the intersection between the board PAa and the axle of the wheel MB. The first electrode E1*a* and the second electrode E2*a* also include an inner edge L1*ia* and an outer edge L1*ea* and an inner edge L2*ia* and an outer edge L2*ea*, respectively, each extending in a circular arc, and linking the lateral edges L1*gx*, L1*dx* and L2*gx*, L2*dx*, respectively. The inner edges L1*ia* and L2*ia* extend in an arc of one and the same circle, while the outer edges L1*ea* and L2*ea* extend in an arc of another one and the same circle.

The common electrode Ema consists of a first branch Bga, of a second branch Bda, of a median branch Bca and of a central portion Bpa linking the first branch Bga, the second branch Bda and the median branch Bca. The first branch Bga, the second branch Bda and the median branch Bca extend radially with respect to a circle, the centre of which would be the intersection between the board PAa and the axle of the wheel MB. The first branch Bga, the second branch Bda and the median branch Bca are substantially equal in length. The first branch Bga extends facing the first electrode E1*a* only. More specifically, a first edge Bgda of the common electrode Ema, said first edge Bgda belonging to the first branch Bga, faces the lateral edge L1*ga* of the first electrode E1*a*. The second branch Bda extends facing the second electrode E2*a* only. More specifically, a second edge Bdga of the common electrode Ema, said second edge Bdga belonging to the second branch Bda, faces the lateral edge L2*da* of the second electrode E2*a*. The median branch Bca extends between the first electrode E1*a* and the second electrode E2*a*, in particular facing the lateral edge L1*da* of the first electrode E1*a* and the lateral edge L2*ga* of the second electrode E2*a*. The central portion Bpa extends in a circular arc between the first branch Bga and the second branch Bda, passing through the median branch Bca.

It should be noted that the central portion Bpa links the ends of the first branch Bga, of the second branch Bda and of the median branch Bca located closest to the intersection between the board Pa1 and the axle of the wheel MB. The central portion Bpa is therefore located partly facing the inner edges L1*ia* and L2*ia*. However, in one alternative embodiment (not shown), the central portion Bpa links the ends of the first branch Bga, of the second branch Bda and of the median branch Bca located furthest from the intersection between the board Pa1 and the axle of the wheel MB. The central portion Bpa is then located partly facing the outer edges L1*ea* and L2*ea*.

The position of the central portion has an effect on the coupling between the common electrode and the arbor of the wheel and on the coupling between the common electrode and another metal element of the movement (for example a wheel or an arbor) which would be located close to the ends of the branches located furthest from the intersection between the board and the axle of the wheel MB. Such coupling interferes with the measurements. In the embodiment shown in FIG. 3, the coupling between the common electrode and the other metal element is minimized. In the alternative embodiment (not shown), the coupling between the common electrode and the arbor of the wheel is minimized.

In the second embodiment, illustrated in FIG. 4, the common electrode Emb has a central portion Bpb which takes the shape of a ring sector, the centre of which is the intersection between the board PAb and the axle of the wheel MB. The common electrode Emb therefore includes two lateral edges Bgb, Bdb, extending radially with respect to a circle, the centre of which would be the intersection between the board PAb and the axle of the wheel MB. The common electrode Emb also includes an inner edge Bib and an outer edge Beb, each extending in a circular arc, and linking the lateral edges Bgb, Bdb. In the embodiment shown, the outer edge Beb includes a discontinuity: the common electrode Emb thus includes a protruding portion Bsb protruding radially from the central portion Bpb, from the centre of the outer edge Beb. The protruding portion Bsb is used for connecting purposes.

The first electrode E1*b* and the second electrode E2*b* are positioned symmetrically on either side of the common electrode Emb, and they both surround the common electrode Emb. The first electrode E1*b* includes a radial branch L1*gb* extending radially facing the common electrode Emb. More specifically, a lateral edge L1*gdb* of the radial branch L1*gb* faces the first lateral edge Bgb of the common electrode Emb. The first electrode E1*b* also includes two circumferential branches L1*ib*, L1*eb*, which extend on either side of the common electrode Emb, in the shape of an arc of a circle, the centre of which would be the intersection between the board PAb and the axle of the wheel MB. One of the circumferential branches, L1*ib*, is located on the side of the axle of the wheel MB. The other circumferential branch, L1*eb*, is located on the other side. It should be noted that the circumferential branch L1*eb* includes a circumferential edge L1*eib* positioned facing the outer edge Beb of the common electrode Emb. Similarly, the second electrode E2*b* includes a radial branch L2*db* extending radially facing the common electrode Emb. More specifically, a lateral edge L2*dgb* of the radial branch L2*db* faces the second lateral edge Bdb of the common electrode Emb. The second electrode E2*b* also includes two circumferential branches L2*ib*, L2*eb*, which extend on either side of the common electrode Emb, in the shape of an arc of a circle, the centre of which would be the intersection between the board PAb and the axle of the wheel MB. One of the circumferential branches, L2*ib*, is located on the side of the axle of the wheel MB. The other circumferential branch, L2*eb*, is located on the other side. It should be noted that the circumferential branch L2*eb* includes a circumferential edge L2*eib* positioned facing the outer edge Beb of the common electrode Emb.

In the described embodiments, it should be noted that the coupling between the common electrode and the first electrode and between the common electrode and the second electrode is both radial and lateral. The linear interpolation curve representing (C2−C1)/(C1+C2) according to the angular position of the wheel MB has a shape approaching that shown in FIG. 5, i.e. a substantially triangular shape.

It will be understood that various modifications and/or improvements and/or combinations that will be obvious to those skilled in the art may be added to the various embodiments of the invention described above without departing from the scope of the invention defined by the appended claims. For example, in the first embodiment, it would be possible for the common electrode Ema not to comprise the median branch Bca. In the second embodiment, it would be possible for the first electrode E1*b* and the second electrode E2*b* to comprise only one circumferential branch and/or for the common electrode not to comprise a protruding portion Bsb.

Furthermore, it should be noted that the opening OV in the plate PT of the wheel MB could be replaced with an element having the same geometry as the opening, made of a material having a dielectric permittivity that is different from that of the rest of the plate PT and different from that of the air. This in no way changes the principle of the invention. To generalize, the term "locating element" therefore refers to the opening or to an element of such type.

What is claimed is:

1. A timepiece movement comprising:
   an analogue display, including a rotary indicator and a wheel that rotates as one with said rotary indicator, said wheel including a plate comprising a locating element;
   a device for detecting at least one angular position of the locating element, comprising a board that is fixed with respect to the plate, extending substantially parallel to the plate, and on which a first electrode, a second electrode and a common electrode are arranged, the electrodes being planar and being arranged such that, in one angular position of the wheel, the locating element is located over at least a portion of each electrode, the common electrode including:
   a first edge extending radially facing a lateral edge of the first electrode;
   a second edge extending radially facing a lateral edge of the second electrode;
   a central portion via which at least one point of the first edge and at least one point of the second edge are linked,
wherein the central portion extends partly facing a circumferential edge of the first electrode and partly facing a circumferential edge of the second electrode, the terms radial and circumferential being understood with respect to a circle that would be centred on the intersection between the axle of the wheel and the board.

2. The timepiece movement according to claim 1, wherein the common electrode includes a first branch to which the first edge belongs, a second branch to which the second edge belongs, the central portion linking the ends of the first branch and of the second branch that are closest to the axle of the wheel, referred to as lower ends.

3. The timepiece movement according to claim 1, wherein the common electrode includes a first branch to which the first edge belongs, a second branch to which the second edge belongs, the central portion linking the ends of the first branch and of the second branch that are furthest from the axle of the wheel, referred to as upper ends.

4. The timepiece movement according to claim 2, wherein the common electrode includes a median branch extending radially between the first electrode and the second electrode, said median branch being linked to the central portion.

5. The timepiece movement according to claim 2, wherein the central portion extends in the shape of an arc of a circle centred on the intersection between the axle of the wheel and the board.

6. The timepiece movement according to claim 2, wherein the first electrode and the second electrode take the shape of two sectors of a ring centred on the intersection between the axle of the wheel and the board.

7. The timepiece movement according to claim 1, wherein the central portion of the common electrode takes the shape of a sector of a ring centred on the intersection between the axle of the wheel and the board, and wherein the first electrode and the second electrode surround the common electrode.

8. The timepiece movement according to claim 7, wherein the first electrode includes a radial branch to which the lateral edge of the first electrode belongs, the second electrode includes a second radial branch to which the lateral edge of the second electrode belongs, and each of the first electrode and of the second electrode includes two circumferential branches that are positioned on either side of the common electrode and linked to the radial branch to which the circumferential edge belongs.

9. The timepiece movement according to claim 1, wherein the locating element is an opening through the plate of the wheel.

10. The timepiece movement according to claim 1, wherein the locating element is made of a material having a dielectric permittivity that is different from that of the rest of the plate and from the air.

* * * * *